(12) United States Patent
Wellhoefer et al.

(10) Patent No.: US 12,097,837 B2
(45) Date of Patent: Sep. 24, 2024

(54) PUMP HOUSING OF A HYDRAULIC ASSEMBLY HAVING AN OUTLET VALVE RECEIVING MEANS

(71) Applicant: Robert Bosch GmbH, Stuttgart (DE)

(72) Inventors: Matthias Marcus Wellhoefer, Stuttgart (DE); Juergen Haecker, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 349 days.

(21) Appl. No.: 17/625,645

(22) PCT Filed: Apr. 28, 2020

(86) PCT No.: PCT/EP2020/061731
§ 371 (c)(1),
(2) Date: Jan. 7, 2022

(87) PCT Pub. No.: WO2021/004671
PCT Pub. Date: Jan. 14, 2021

(65) Prior Publication Data
US 2022/0266804 A1   Aug. 25, 2022

(30) Foreign Application Priority Data
Jul. 11, 2019 (DE) .................. 10 2019 210 260.3

(51) Int. Cl.
*B60T 8/32* (2006.01)
*B60T 8/34* (2006.01)
(Continued)

(52) U.S. Cl.
CPC .............. *B60T 8/341* (2013.01); *B60T 8/368* (2013.01); *B60T 17/02* (2013.01)

(58) Field of Classification Search
CPC ........... B60T 8/341; B60T 8/368; B60T 17/02
(Continued)

(56) References Cited

U.S. PATENT DOCUMENTS 4,929,038 A * 5/1990 Reinartz ............. F15B 13/0828
 137/884
5,362,141 A * 11/1994 Beck .................... B60T 8/3675
 148/563

(Continued)

FOREIGN PATENT DOCUMENTS

DE     102 37 163 A1   2/2004
DE   10 2004 030 970 A1   1/2006
(Continued)

OTHER PUBLICATIONS

International Search Report corresponding to PCT Application No. PCT/EP2020/061731, mailed Jul. 6, 2020 (German and English language document) (5 pages).

*Primary Examiner* — Christopher P Schwartz
(74) *Attorney, Agent, or Firm* — Maginot, Moore & Beck LLP (57) ABSTRACT

A pump housing of a hydraulic assembly of a vehicle brake system has at least one wheel brake cylinder connection for connecting a wheel brake cylinder to the pump housing, and an outlet valve receiving member associated with the individual wheel brake cylinder connection to receive an outlet valve, which is provided for letting brake fluid out of the wheel brake cylinder into the pump housing. The outlet valve has a valve inlet that can be closed by a closing element with an associated closing force. The outlet valve receiving member has an inlet for letting brake fluid from the wheel brake cylinder into the outlet valve. The inlet is adapted for guiding the brake fluid in a flow direction opposite the closing force when letting the brake fluid into the outlet valve, when the outlet valve is received in the outlet valve receiving member.

14 Claims, 5 Drawing Sheets

(51) Int. Cl.
*B60T 8/36* (2006.01)
*B60T 17/02* (2006.01)

(58) Field of Classification Search
USPC .......... 303/113.1, 113.4, 116.2, 116.4, 119.3
See application file for complete search history.

(56) References Cited

U.S. PATENT DOCUMENTS

| | | | |
|---|---|---|---|
| 5,904,180 A | * | 5/1999 | Iwamura ................ B60T 8/368 |
| | | | 137/884 |
| 2012/0326495 A1 | * | 12/2012 | Trageser ................ B60T 8/368 |
| | | | 303/119.2 |

FOREIGN PATENT DOCUMENTS

| | | | | |
|---|---|---|---|---|
| EP | 0 524 440 A1 | | 1/1993 | |
| EP | 0 887 242 A2 | | 12/1998 | |
| GB | 2486062 A | * | 6/2012 | ............ B60T 13/146 |
| JP | H6-44661 U | | 6/1994 | |
| JP | H11-11286 A | | 1/1999 | |
| JP | 2000-142354 A | | 5/2000 | |

* cited by examiner

PUMP HOUSING OF A HYDRAULIC ASSEMBLY HAVING AN OUTLET VALVE RECEIVING MEANS

This application is a 35 U.S.C. § 371 National Stage Application of PCT/EP2020/061731, filed on Apr. 28, 2020, which claims the benefit of priority to Serial No. DE 10 2019 210 260.3, filed on Jul. 11, 2019 in Germany, the disclosures of which are incorporated herein by reference in their entirety.

BACKGROUND

The disclosure relates to a pump housing of a hydraulic assembly of a vehicle braking system having at least one wheel brake cylinder connection for connecting a wheel brake cylinder to the pump housing, having an outlet valve receiving member which belongs to the individual wheel brake cylinder connection for receiving an outlet valve which is provided to discharge brake fluid from the wheel brake cylinder into the pump housing and which comprises a valve inlet which is intended to be closed with a closure member having an associated closure force, wherein the outlet valve receiving member has an inlet for introducing brake fluid from the wheel brake cylinder into the outlet valve. Furthermore, the disclosure relates to the use of such a pump housing in a hydraulic assembly of a vehicle braking system.

Hydraulic assemblies are used in motor vehicles, such as in particular passenger vehicles or trucks, to provide brake pressures which are controlled at the braking system thereof. In particular, using such hydraulic assemblies, functions of an anti-lock braking system (ABS), a traction control system (TCS), and/or an electronic stability program (ESP) are performed. To this end, brake pressure is produced in the braking system in a main cylinder by means of a brake pedal. In order to meter the brake pressure, the hydraulic assembly has a pump with a plurality of pump pistons, a motor for driving the pump and a plurality of valves. The valves are generally controlled electromagnetically so that different brake pressures can be provided at individual brakes or brake circuits. For a hydraulic connection of the hydraulic assembly to wheel brake cylinders on associated wheel brakes, wheel brake cylinder connections are formed on the hydraulic assembly.

A pump housing of such a hydraulic assembly is in most cases configured in a parallelepipedal or block-like manner from aluminum and provided with holes for the arrangement of the structural elements, in particular the valves, and the lines. In this instance, at least one outlet valve receiving member which is in the form of a hole is provided. An outlet valve for discharging brake fluid from an associated wheel brake cylinder into the pump housing is received therein. To this end, the outlet valve comprises a valve inlet for introducing the brake fluid into the outlet valve and a closure member which closes the valve inlet with a closure force. In this instance, the brake fluid is conventionally guided so as to flow transversely to the closure force through the valve inlet and an inlet of the outlet valve receiving member which is arranged thereon.

SUMMARY

There is provided, according to the disclosure, a pump housing of a hydraulic assembly of a vehicle braking system having at least one wheel brake cylinder connection for connecting a wheel brake cylinder to the pump housing, having an outlet valve receiving member which belongs to the individual wheel brake cylinder connection for receiving an outlet valve which is provided to discharge brake fluid from the wheel brake cylinder into the pump housing and which comprises a valve inlet which is intended to be closed with a closure member having an associated closure force, wherein the outlet valve receiving member has an inlet for introducing brake fluid from the wheel brake cylinder into the outlet valve. In this instance, the inlet is adapted to guide the brake fluid during introduction into the outlet valve in a flow direction which is directed counter to the closure force when the outlet valve is received in the outlet valve receiving member.

With the inlet of the outlet valve receiving member as adapted according to the disclosure, the brake fluid during a continuing or subsequent introduction through the valve inlet into the outlet valve is guided so as to flow axially counter to the closure force. Consequently, the brake fluid acts with the flow direction thereof and a flow force which acts therewith directly axially counter to the closure force with the force vector thereof. The term "directly axially" is intended to be understood to mean that the brake fluid does not press axially counter to the closure force of the closure member only after and by means of a preceding redirection by means of other components in the outlet valve. Such a redirection is known in conventionally controllable outlet valves, in which the brake fluid flows in transversely relative to the closure force through a conventional inlet and valve inlet. For redirection, inside the outlet valve there are provided redirection components which are complex to produce and by means of which the brake fluid which flows in transversely relative to the closure force is redirected in the flow path thereof so as to act axially counter to the closure force.

In contrast, it is possible with the inlet which is adapted according to the disclosure for the brake fluid to act directly axially counter to the closure force without friction, pressure and energy losses which are otherwise caused by the redirection. Consequently, the brake fluid flows during flow through the inlet and through the valve inlet which is intended to be arranged at the inlet in a particularly energy efficient manner axially counter to the closure member. Consequently, the brake fluid presses the closure member and a tappet which is in particular connected thereto so as to transmit force in the longitudinal direction of the tappet away from the valve inlet.

In addition to such energy efficiency, it is particularly advantageous that, by means of the inlet which is adapted according to the disclosure, an outlet valve which is controllable can be received in the outlet valve receiving member. The term "controllable" is intended to be understood to mean in particular that the brake fluid in terms of its throughflow quantity per unit of time through the outlet valve can be adapted as required. For such controllability of the outlet valve, by means of which a brake pressure on the wheel brake cylinder can be discharged in a selective and controlled manner, it is necessary for the closure member to be subjected to flow axially counter to the closure force thereof. Such a flow is now possible in a simple manner with the inlet which is adapted according to the disclosure. Consequently, the outlet valve can be configured in a structurally technically simple manner without complex redirection components and introduced into the outlet valve receiving member and can be controlled in spite of its simple construction.

Consequently, with the pump housing according to the disclosure, a solution with optimal costs for implementing controllable outlet valves of the hydraulic assembly of a vehicle braking system or a brake control system is provided. With such a controllable outlet valve, when brake fluid is discharged from the wheel brake cylinder into the pump housing, the brake pressure at the wheel brake cylinder can be discharged in a selective, controlled manner. Consequently, a recovery efficiency of hybrid electric vehicles (Hybrid Electric Vehicle Systems, HEV systems) can be optimized. Particularly in this instance, a recovery or regeneration of otherwise lost brake energy is improved. In addition, normal control algorithms for anti-lock braking systems (ABS), traction control systems (TCS), adaptive cruise control (ACC) and electronic stability program (ESP) can be optimized in terms of their performance. It is possible to discharge precisely the necessary pressure which is required as a pressure drop. It has been found that with the pump housing according to the disclosure and the associated control of the outlet valve, optimal system costs with improved recovery efficiency are enabled. Additional costs which are involved for the adaptation of the inlet according to the disclosure and where applicable a connected line are easily overcompensated for by possible simplifications in the design of the outlet valve.

Advantageously, the outlet valve receiving member has according to the disclosure an axis along which the closure force acts when the outlet valve is received in the outlet valve receiving member. In this instance, the inlet is arranged axially with respect to the axis. In a state arranged in such a manner, a particularly uniform force distribution between the outlet valve receiving member and the outlet valve is provided when the brake fluid flows through the inlet into the outlet valve. The inlet and in particular the valve inlet which is arranged thereon are intended to be flowed through centrally and in a targeted manner by the brake fluid which flows accordingly centrally and in a targeted manner with the flow direction thereof counter to the closure force acting on the closure member. In particular, the axis of the outlet valve receiving member corresponds in this instance to the longitudinal axis of the outlet valve receiving member along which the outlet valve is arranged with the longitudinal axis thereof.

Furthermore, according to the disclosure, there is received in the outlet valve receiving member the outlet valve which comprises the valve inlet which is intended to be closed with the closure member with the associated closure force thereof. In this instance, the closure force is applied by means of a resilient element. Consequently, the closure member is urged with the resilient element against the valve inlet and the closure force is determined by the resilient element. The resilient element has a spring characteristic line which is preferably adapted for a brake pressure to be able to be discharged in a selectively controlled manner from the wheel brake cylinder by means of the outlet valve. In particular to this end, using the resilient element, a through-flow quantity of brake fluid per time unit is intended to be controlled. With the resilient element, the outlet valve is configured in a structurally technically simple manner and can be controlled in a cost-effective manner. In particular, no redirection components which are otherwise required are necessary to do this. In addition, the outlet valve which can be controlled in this manner has compared with an electromagnetic switching valve which is often used as an outlet valve initially the advantage of controllability. Otherwise, using a conventional switching valve, a pressure of the brake fluid which is applied to the wheel brake cylinder cannot be reduced in a selectively controlled manner when brake fluid is discharged from the wheel brake cylinder. Instead, an overshoot or overshooting often occurs. A readjustment using simply controllable inlet valves is then required. Inlet valves are generally intended to be closed counter to a brake fluid flow using magnetic force and can consequently be controlled in a simple manner.

Furthermore, there are advantageously provided on the pump housing according to disclosure a motor side for arranging a drive motor and a control device side opposite the motor side for arranging a control device. In this instance, the inlet is adapted so that the flow direction counter to the closure force is directed between the motor side and the control device side. Such a flow direction corresponds in terms of its axial extent to the generally conventional axial extent between the motor side and the control device side. Consequently, only small structural adaptations to the pump housing are required for the inlet of the outlet valve receiving member and the outlet valve which is intended to be received at that location. The pump housing may be kept constant in terms of its outer dimensions and cost-effective existing structural spaces in particular in a vehicle braking system can be used. Preferably, in this instance, the flow direction is directed from the motor side to the control device side. Consequently, the flow direction is adapted to a conventional flow direction for an associated inlet valve. Accordingly, only slight adaptations are required. In a state adapted to a respective structural situation, the flow direction can also be directed from the control device side to the motor side.

In addition, according to the disclosure, the outlet valve receiving member advantageously has an axis along which the closure force acts when the outlet valve is received in the outlet valve receiving member and an inlet valve receiving member which belongs to the outlet valve receiving member is provided for receiving an inlet valve for introducing brake fluid from the pump housing into the wheel brake cylinder, wherein the inlet valve receiving member has an outlet for discharging brake fluid from the inlet valve to the wheel brake cylinder. In this instance, there is provided a connection line which leads from the outlet of the inlet valve receiving member to the wheel brake cylinder and which is adapted so that the inlet valve can be flowed through in the same flow direction with respect to the axis when brake fluid is introduced to the wheel brake cylinder and the outlet valve when brake fluid is discharged from the wheel brake cylinder. Consequently, a uniform flow direction of brake fluid both during introduction from the pump housing into the wheel brake cylinder and during discharge from the wheel brake cylinder into the pump housing is ensured. In particular, in this instance, the inlet valve is intended to be flowed through in conventional manner from the motor side to the control device side. In addition, the outlet valve is now also intended to be flowed through from the motor side to the control device side. In a state flowed through in this manner, the brake fluid is axially directed with the flow force thereof counter to the closure force acting on the closure member. Consequently, the outlet valve, as already described, can be controlled in a particularly simple manner. If the flow direction is preferably directed from the motor side to the control device side, as known for the inlet valve, the conventional lines and valves can be used to the greatest possible extent. Only a few adaptations are required so that a great action with particular regard to the controllability of the outlet valve can be achieved. Alternatively, a corresponding flow direction from the control device side to the motor side is possible. To this end, the outlet of the inlet valve receiving member is in particular adapted to guide the brake fluid when discharged from the inlet valve firstly in a flow direction which is directed transversely relative to the flow direction of the brake fluid which is directed counter to the closure force during introduction into the outlet valve.

Advantageously, according to the disclosure, the connection line is guided from the outlet of the inlet valve receiving member into a region of the outlet valve receiving member facing the wheel brake cylinder. In this instance, the outlet is in particular coupled in a fluid-conducting manner to a valve inlet of an inlet valve which is received in the inlet valve receiving member. Consequently, the brake fluid is intended to be guided out of the inlet valve into the region of the outlet valve receiving member which faces the wheel brake cylinder. From this region, the brake fluid is guided by a line or wheel brake cylinder line for introduction into the wheel brake cylinder. The brake fluid for discharge from the wheel brake cylinder is guided, through the same line and into the same region, through the inlet into the outlet valve receiving member and the outlet valve which is received at that location. Consequently, in a particularly simple manner in technical construction terms, an axially identical flow direction of the brake fluid through the inlet valve and through the outlet valve is provided.

Furthermore, the connection line according to the disclosure is advantageously guided out of the outlet of the inlet valve receiving member into a wheel brake cylinder line which leads from the wheel brake cylinder to the inlet of the outlet valve receiving member. To this end, there is in particular provided in the wheel brake cylinder line a branch, in which the connection line is guided. Consequently, the brake fluid is guided from the outlet by means of the connection line into the wheel brake cylinder line, by means of which the brake fluid is then guided into the wheel brake cylinder. In order to discharge the brake fluid from the wheel brake cylinder, the brake fluid is guided back through the wheel brake cylinder line and through the inlet of the outlet valve receiving member into the outlet valve which is received therein. An axially identical flow direction of the brake fluid through the inlet valve and through the outlet valve is also provided as a result. In addition, the connection line can therefore be adapted to a corresponding arrangement and geometry of the inlet valve receiving member and outlet valve receiving member. Both valve receiving members can be arranged in a space-saving manner with little spacing from each other.

To this end, the connection line is advantageously configured, according to the disclosure, with a line portion which is guided obliquely with respect to the axis along which the closure force acts. In particular in this instance, the axis is the longitudinal axis of the outlet valve receiving member. With the oblique line portion, the inlet valve receiving member is connected from the outlet thereof directly and immediately to the region of the outlet valve receiving member facing the wheel brake cylinder. In this instance, there are no friction losses produced as a result of line redirections. In addition, a single oblique line portion is simple to produce in technical construction terms. The advantages of the oblique line portion are also achieved with a correspondingly direct connection of the inlet valve receiving member and the wheel brake cylinder line. In this instance, the oblique line portion is configured to be steeper than the oblique line portion which connects the outlet of the inlet valve receiving member to the region of the outlet valve receiving member facing the wheel brake cylinder.

Furthermore, the connection line is advantageously configured according to the disclosure with at least a first line portion and at least a second line portion. In this instance, the individual first line portion is guided parallel and the individual second line portion is guided at right-angles in each case with respect to the axis along which the closure force acts. In particular in this instance, the axis is the longitudinal axis of the outlet valve receiving member. Consequently, a wide variation possibility for the configuration of the connection line is provided. Additional components may be provided between the inlet valve receiving member and the outlet valve receiving member in the pump housing. The brake fluid can be readily guided around these additional components by means of a connection line which has a corresponding combination of at least a first and at least a second line portion and/or at least one oblique line portion.

Furthermore, the connection line is advantageously configured with at least three line portions which are configured to extend in three-dimensional space. In a state configured in this manner, an even greater variation possibility for adaptation of the connection line to structural circumstances in the pump housing is provided. In this instance, the at least three line portions are preferably, depending on requirements, arranged obliquely, at right-angles and/or parallel with respect to the axis along which the closure force acts.

In addition, the disclosure is directed toward use of such a pump housing in a hydraulic assembly of a vehicle braking system. The above-mentioned advantages of a cost-effective controllable outlet valve together with improved recovery efficiency in vehicle braking systems, in particular in HEV systems, are achieved.

BRIEF DESCRIPTION OF THE DRAWINGS

Embodiments of the solution according to the disclosure will be explained in greater detail below with reference to the appended schematic drawings, in which.

DETAILED DESCRIPTION

In this instance, all spatial indications, such as left, right, bottom, top, vertical and horizontal refer to a drawing plane of FIG. 1 to FIG. 7, respectively.

Figure 1:
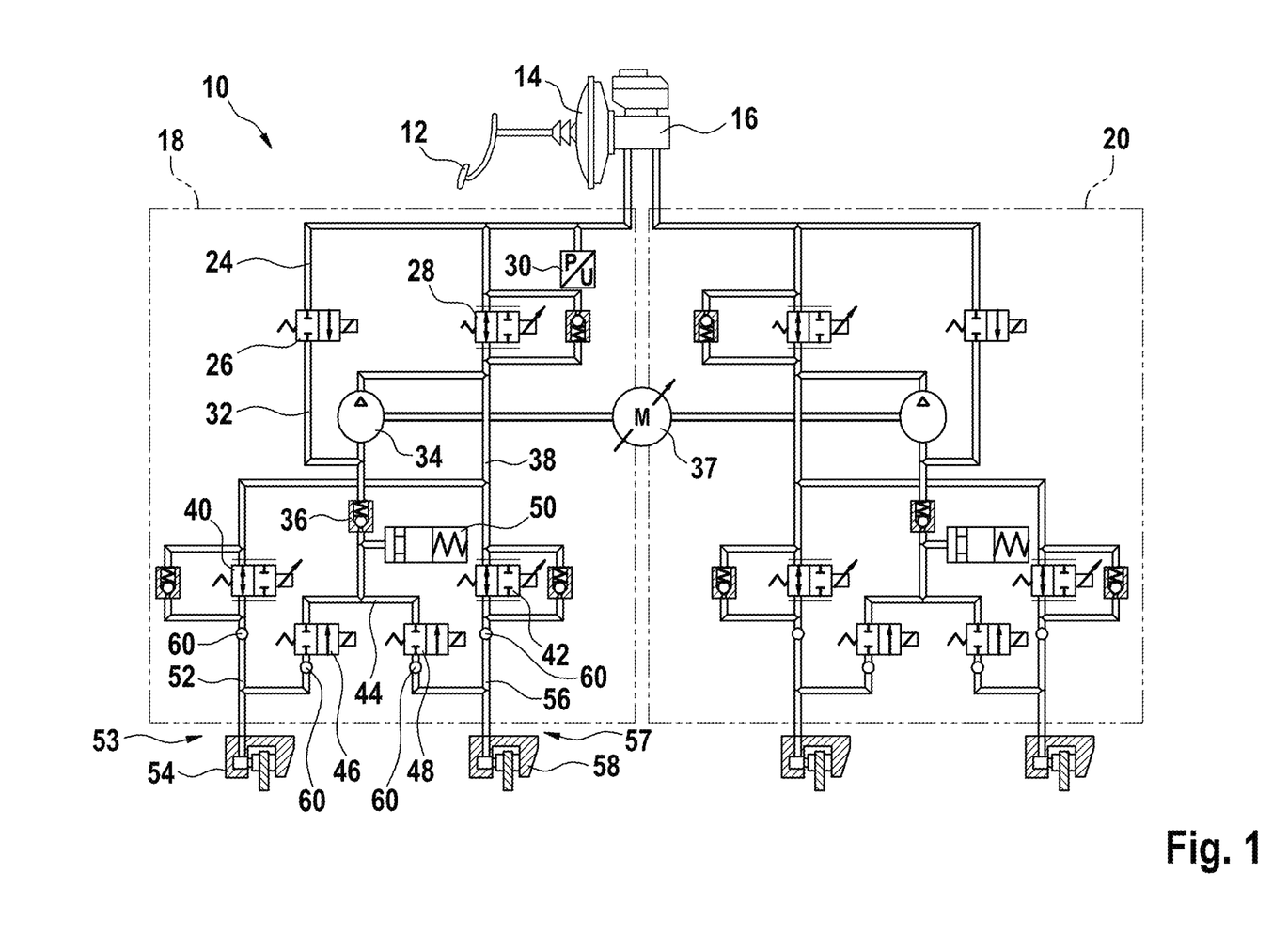
FIG. 1 is a hydraulic plan of a vehicle braking system according to the prior art.

A vehicle braking system 10 illustrated in FIG. 1 comprises a brake pedal 12 having a brake force booster 14 and a main cylinder 16 which is connected thereto. The main cylinder 16 is connected to two largely structurally identical brake circuits 18 and 20 which are arranged substantially in a common pump housing 22 of a hydraulic assembly 23 (see in each case as a cut-out in FIG. 2). Only one of these brake circuits, that is to say, the brake circuit 18, will be explained in greater detail below.

For the brake circuit 18, a line 24 leads from the main cylinder 16 to a high-pressure switching valve 26 and a switching valve 28. A pressure sensor 30 is further connected to the line 24. From the high-pressure switching valve 26, a line 32 leads to the suction side of a pump element 34 and to a non-return valve 36. In this instance, the pump element 34 is coupled to a drive motor 37 so as to transmit force. From the switching valve 28, a line 38 leads to the pressure side of the pump element 34 and to a first inlet valve 40 and a second inlet valve 42. From the non-return valve 36, a line 44 leads to a first outlet valve 46 and a second outlet valve 48. A store 50 is further connected to the line 44. From the first inlet valve 40, a line or wheel brake cylinder line 52 leads by means of a wheel brake cylinder connection 53 to a first wheel brake cylinder 54 and to the first outlet valve 46. From the second inlet valve 42, a line or wheel brake cylinder line 56 leads by means of a wheel brake cylinder connection 57 to a second wheel brake cylinder 58 and to the second outlet valve 48. The inlet valves 40 and 42 and outlet valves 46 and 48 are each protected by a filter element 60 from the introduction of particles to the associated function-relevant components of the valves. The filter elements 60 are located in this instance directly on the valves in each case at the side facing the wheel brake cylinder 54 and 58 in the lines 52 and 56, respectively.

Figure 2:
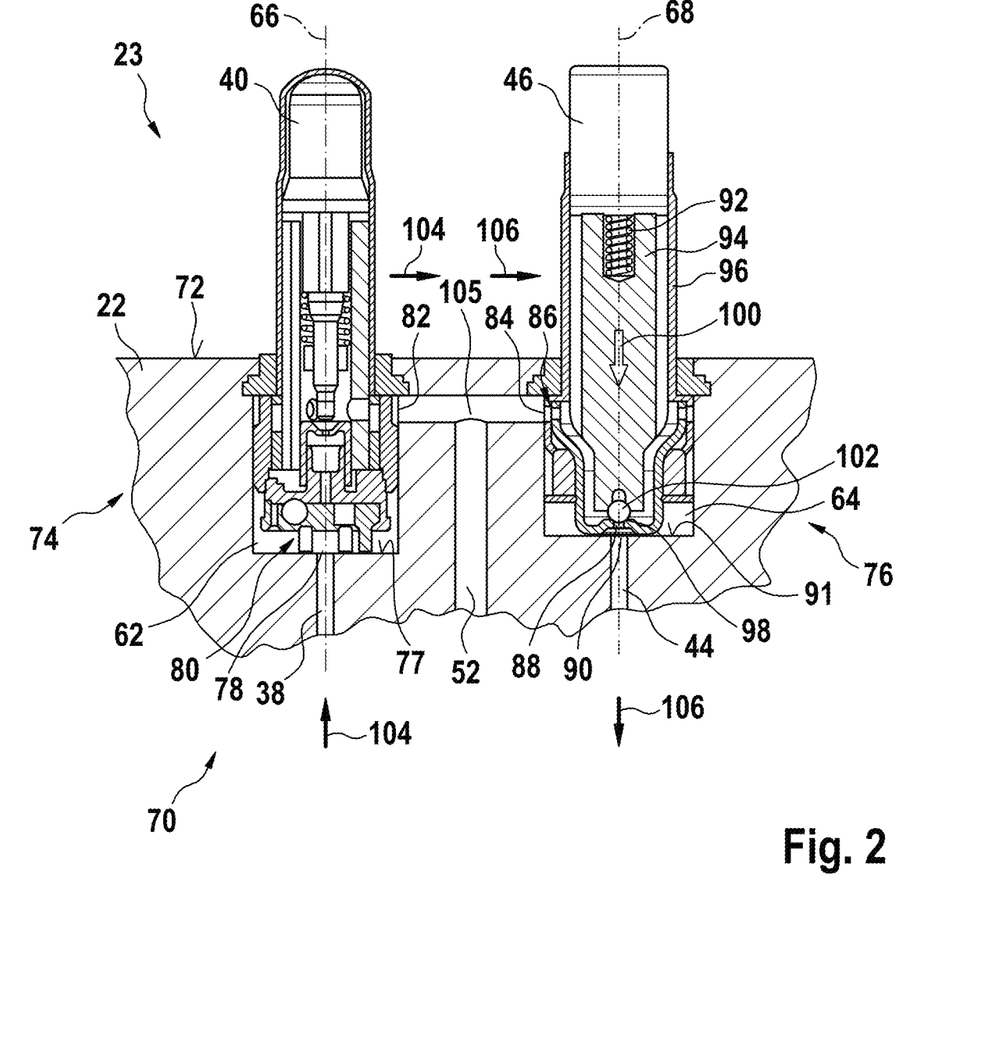
FIG. 2 is a schematic illustration of a cut-out of a pump housing of a motor vehicle hydraulic assembly according to the prior art.

FIG. 2 is a cut-out of the pump housing 22 of the hydraulic assembly 23 which, as a block-shaped housing or hydraulic block, is formed substantially from one aluminum block in which openings or receiving members are formed by means of drilling or milling. In this instance, for example, only the first inlet valve 40 and the first outlet valve 46 which belong to the first wheel brake cylinder 54 are illustrated. The following explanations apply accordingly to all other inlet valves 42 and associated outlet valves 48 of the hydraulic assembly 23. In this instance, the first inlet valve 40 is referred to below as an inlet valve 40 and the first outlet valve 46 is referred to below as an outlet valve 46.

The inlet valve 40 is received in a cup-like inlet valve receiving member 62 which is in the form of an inlet valve hole and the outlet valve 46 is received in a cup-like outlet valve receiving member 64 which is in the form of an outlet valve hole. In this instance, the inlet valve receiving member 62 has a longitudinal axis or axis 66, along which the inlet valve 40 is arranged with the longitudinal extent thereof and the outlet valve receiving member 64 has a longitudinal axis or axis 68, along which the outlet valve 46 is arranged with the longitudinal extent thereof.

Furthermore, the pump housing 22 comprises a motor side 70 for arranging the drive motor 37 and a control device side 72 opposite the motor side 70 on which a control device (Electronic Control Unit (ECU)) which is not illustrated is intended to be arranged. There are provided in the control device side 72 two openings which form the inlet valve receiving member 62 and the outlet valve receiving member 64 whose axes 66 and 68 are orientated parallel with each other and at right-angles with respect to the control device side 72. In addition, there is located to the right on the pump housing 22 another wheel brake cylinder side or side 74 which is not illustrated and in which four wheel brake cylinder openings are provided. The wheel brake cylinder connections 53 and 57 for the wheel brake cylinders 54 and 58 are intended to be received therein in each case. Opposite the side 74 is a side 76 in which two storage openings which are not illustrated for receiving the store 50 are provided.

There is provided on the inlet valve receiving member 62 at the bottom or on a cup-like base 77 of the inlet valve receiving member 62 or directed toward the motor side 70 an inlet 78 in which the line 38 is guided. Through the inlet 78, brake fluid is guided into the inlet valve 40 through the valve inlet 80 thereof. Furthermore, there is arranged on the inlet valve receiving member 62 laterally at the top or in the direction of the control device side 72 an outlet 82 from which the line 52 leads to the wheel brake cylinder 54.

From the wheel brake cylinder 54, the line 52 leads into an inlet 84 of the outlet valve receiving member 64 which is arranged laterally at the top or in the direction of the control device side 72 on the outlet valve receiving member 64. Accordingly, there is also arranged on the outlet valve 46 laterally at the top a valve inlet 86 through which by means of the inlet 84 the brake fluid is guided from the line 52 into the outlet valve 46. In order to discharge the brake fluid into the line 44, there is provided on the outlet valve 46 a valve outlet 88 on which an outlet 90 of the outlet valve receiving member 64 is arranged. Both the valve outlet 88 and the outlet 90 are positioned at the bottom or on a cup-like base 91 of the outlet valve receiving member 64 or in the direction of the motor side 70.

The outlet valve 46 is a solenoid valve which is closed in a current-free manner by means of a mechanical spring or a resilient element 92. With the application of electrical current, the outlet valve 46 can be opened. To this end, the outlet valve 46 comprises a valve tappet 94 which is surrounded by a sleeve 96 and which is resiliently pretensioned by means of the resilient element 92 against a valve seat 98. The resilient element 92 applies a closure force 100 which acts with the force vector thereof along an axis of the outlet valve 46 which in this instance corresponds to the longitudinal axis or axis 68 of the outlet valve receiving member 64. With the closure force 100, a closure member 102 which is coupled to the valve tappet 94 is urged against the valve seat 98. Consequently, the valve inlet 88 or the valve opening which is surrounded by the valve seat 98 is closed. The closure member 102 and the valve tappet 94 can be lifted out of this position off the valve seat 98 by means of an electromagnetic coil which partially surrounds the valve tappet 94 and which is not illustrated in order to provide a flow path through the outlet valve 46. This flow path has a constant opening cross section. Consequently, a brake pressure which is applied to the wheel brake cylinder 54 when brake fluid is discharged from the wheel brake cylinder 54 cannot be reduced in a selectively controlled manner. Instead, overshooting may occur and makes a readjustment using inlet valves 40 which can be controlled in a simple manner necessary. When the magnetic force is switched off, the outlet valve 46 is intended to be closed with the closure force 100 which acts on the closure member 102 by means of the resilient element 92.

When brake fluid is introduced into the wheel brake cylinder 54, the brake fluid flows from the line 38 in an inlet flow direction 104 through the inlet valve 40. In this instance, the inlet flow direction 104 is determined with the arrangement of the inlet 78 or the valve inlet 80 and the arrangement of the outlet 82 from the motor side 70 to the control device side 72. From the outlet 82, the brake fluid flows horizontally or laterally through the line 52 in the direction of the inlet 84 or the valve inlet 86 of the outlet valve 46. The line 52 acts in this instance as an intermediate connection between the inlet valve receiving member 62 and the outlet valve receiving member 64. When the outlet valve 46 is closed, the brake fluid in this instance flows through the line 52 by means of a branch 105 to the wheel brake cylinder 54 and applies a brake pressure at that location to the associated wheel brake.

In order to reduce or discharge the brake pressure on the wheel brake cylinder 54 or to discharge the brake fluid from the wheel brake cylinder 54, the outlet valve 46 is opened by means of the application of electrical current. The brake fluid then flows from the wheel brake cylinder 54 through the line 52 in an outlet flow direction 106 through the outlet valve 46. In this instance, the outlet flow direction 106 is determined with the arrangement of the inlet 84 or valve inlet 86 and the arrangement of the outlet 90 or valve outlet 88. As a result, the brake fluid flows laterally upward through the inlet 84 or valve inlet 86 of the outlet valve 46 and downward through the valve outlet 88 or outlet 90 into the line 44. The outlet flow direction 106 thus extends with respect to the axis 68 from the control device side 72 to the motor side 70 and consequently counter to the inlet flow direction 104 with respect to the axes 66 or 68. Furthermore, when brake fluid is introduced through the inlet 84 or valve inlet 86 into the outlet valve 46, the brake fluid flows in the outlet flow direction 106 transversely relative to the axis 68 and consequently transversely relative to the closure force 100 which acts by means of the resilient element 92 on the closure member 102. Consequently, the outlet valve 46 cannot be controlled without additional measures, only switched.

FIGS. 3 to 7 show embodiments of a pump housing 108 which largely has components with identical functions to the pump housing 22. Accordingly, these components are given the same reference numerals.

Figure 3:
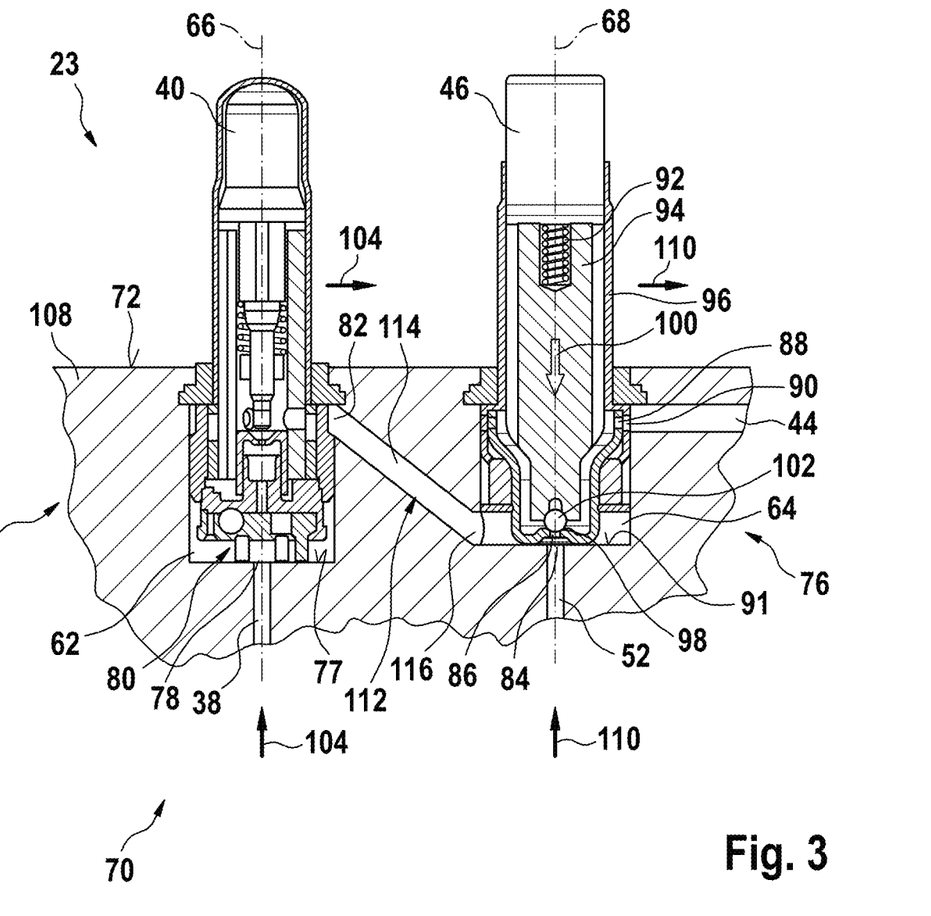
FIG. 3 is a schematic illustration of the view according to FIG. 2 of a first embodiment of the pump housing according to the disclosure.

In contrast to the pump housing 22, in the pump housing 108 the inlet 84 of the outlet valve receiving member 64 is positioned at the bottom or on the base of the cup-like outlet valve receiving member 64 or in the direction toward the motor side 70. The inlet 84 is in this instance arranged concentrically with respect to the cross section of the outlet valve receiving member 64 and consequently axially with respect to the axis 68. In addition, the inlet 84 is connected to the line 52 in which the brake fluid is guided from the wheel brake cylinder 54 to the outlet valve receiving member 64. Furthermore, in the outlet valve 46 received in the outlet valve receiving member 64, the valve inlet 86 is arranged in accordance with the inlet 84 or on the inlet 84. In a state arranged in this manner, the brake fluid flows when introduced through the valve inlet 86 into the outlet valve 46 along the axis 68 in a flow direction 110 which acts axially counter to the closure force 100. Consequently, the inlet 84 is adapted so that the brake fluid when introduced into the outlet valve 46 is guided so as to act axially counter to the closure force 100 which the resilient element 92 applies to the closure member 102. In this instance, the resilient element 92 is in the form of a helical spring whose spring characteristic line is adapted to discharge the brake pressure in a selectively targeted manner from the wheel brake cylinder 54 by means of the outlet valve 46.

In order to discharge the brake fluid from the outlet valve 46, the valve outlet 88 and the associated outlet 90 of the outlet valve receiving member 64 is arranged laterally at the top right in the direction toward the control device side 72. Accordingly, the brake fluid flows when discharged from the wheel brake cylinder 54 from the inlet 84 to the outlet 90 in the flow direction 110 or outlet flow direction from the motor side 70 to the control device side 72. In this instance, the flow direction 110 is directed with respect to the axis 68 counter to the closure force 100 during introduction into the outlet valve 46.

Furthermore, there is provided a connection line 112 or connection hole or a connection channel which leads from the inlet valve receiving member 62 in the direction of the outlet valve receiving member 64. To this end, the connection line 112 leads from the outlet 82 of the inlet valve receiving member 62, which is arranged laterally at the top right or in the direction of the control device side 72, out of the inlet valve 40. In addition, the connection line 112 leads to the wheel brake cylinder 54.

In a state guided in this manner, when the brake fluid is introduced into the wheel brake cylinder 54, the brake fluid flows through the inlet valve 40 in the inlet flow direction 104 from the motor side 70 to the control device side 72. The brake fluid then flows through the connection line 112 into the wheel brake cylinder 54 and from there through the line 52 through the outlet valve 46 in the outlet flow direction 110 from the motor side 70 to the control device side 72. In this instance, the inlet flow direction 104 and the outlet flow direction 110 are orientated in the same direction at least with respect to the axis 68. Consequently, therefore, the inlet valve 40 and the outlet valve 46 are flowed through by means of the connection line 112 in the same flow direction 104 and 110 with respect to the axis 68.

To this end, the connection line 112 may have different embodiments which are illustrated in FIGS. 4 to 7 purely schematically and for greater clarity without the outlet valve 40 and inlet valve 46.

Figure 4:
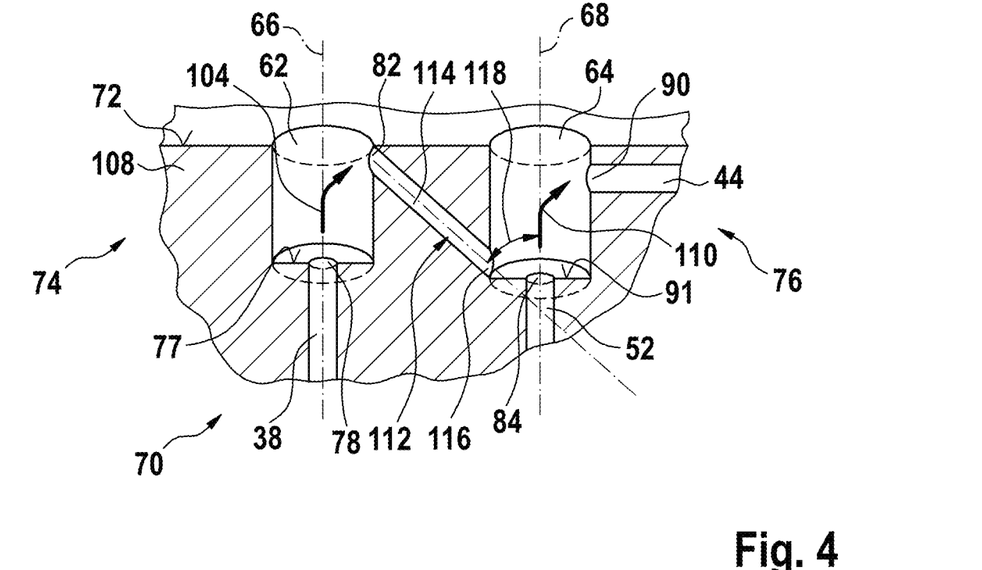
FIG. 4 is a simplified schematic illustration of the first embodiment of the pump housing according to the disclosure.

According to FIGS. 3 and 4, the connection line 112 is configured as a line portion 114 which extends obliquely with respect to the axis 68 of the outlet valve receiving member 64. In this instance, the line portion 114 and the axis 68 define an acute angle 118. In addition, the connection line 112 is guided into a region 116 of the outlet valve receiving member 64 which faces the wheel brake cylinder 54. The region 116 is in this instance arranged at the bottom or on the cup-like base 91. From the region 116, the brake fluid is then directed out of the outlet valve receiving member 64 through the line 52 into the wheel brake cylinder 54 in order to introduce the brake fluid into the wheel brake cylinder 54. In order to discharge the brake fluid from the wheel brake cylinder 54, the brake fluid is guided out of the wheel brake cylinder 54 through the same line 52 from the bottom into the outlet valve receiving member 64 and the outlet valve 46 which is arranged therein. Consequently, the connection line 112 is configured as a simple direct oblique hole.

Figure 5:
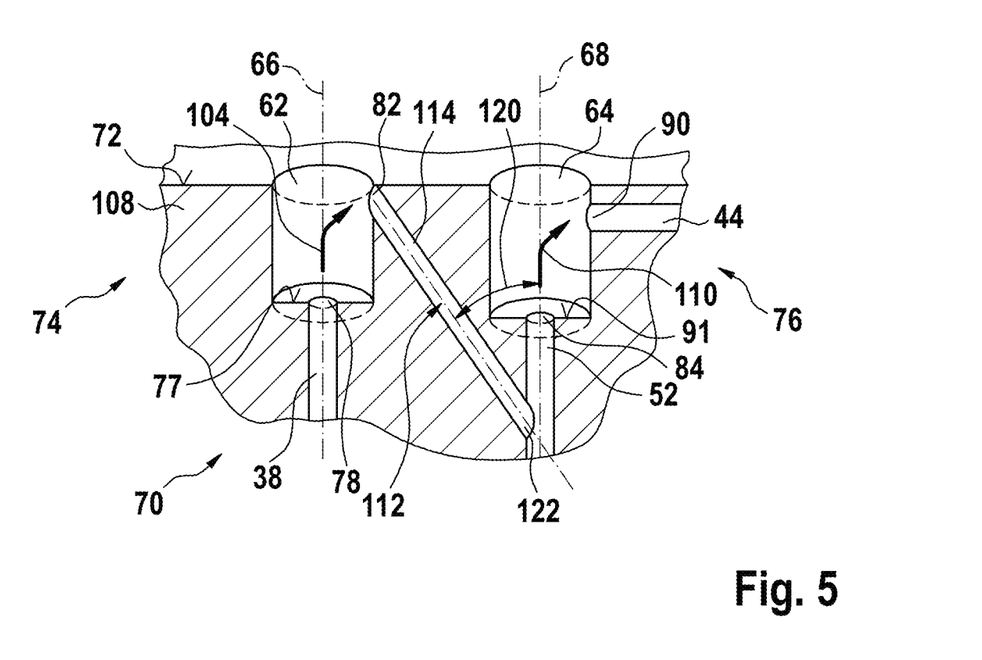
FIG. 5 shows the view according to FIG. 4 of a second embodiment of the pump housing according to the disclosure.

According to FIG. 5, the connection line 112 is also configured from a line portion 114 which is guided obliquely with respect to the axis 68. In this instance, an acute angle 120 defined between the connection line 112 and the axis 68 is smaller than the acute angle 118. Consequently, the connection line 112 is arranged more steeply than in the embodiment according to FIG. 4. In addition, the connection line 112 is guided at a branch 122 directly into the line 52. Consequently, the connection line 112 is configured as a simple, direct and steeper oblique hole such that the spacing of the inlet valve 40 and the outlet valve 46 is smaller than it can be in the embodiment according to FIG. 4. In this instance, the line 52 is located below the outlet valve receiving member 64 or in the direction toward the motor side 70. Furthermore, the line 52 is in this instance configured as a wheel connection hole or wheel channel.

Figure 6:
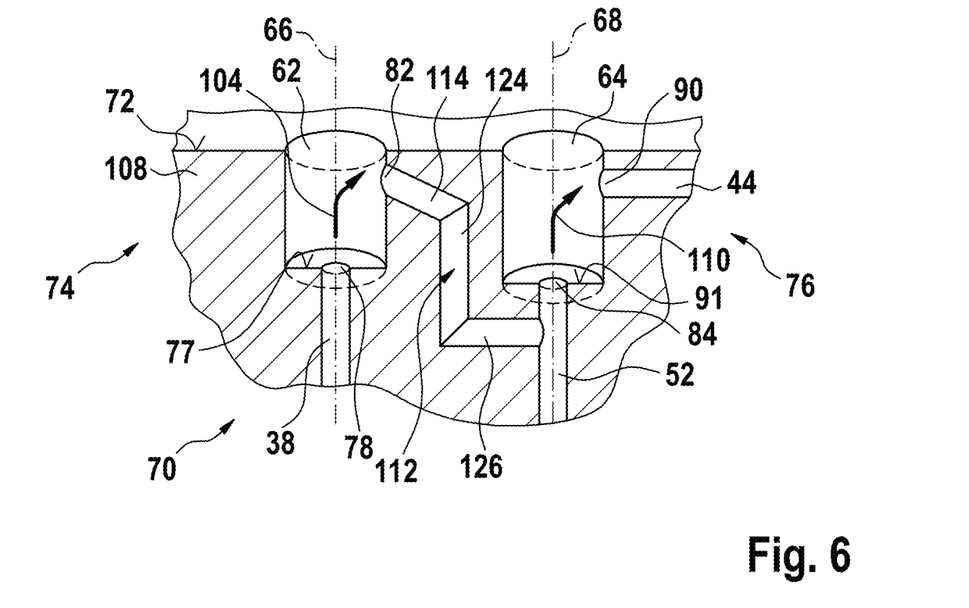
FIG. 6 shows the view according to FIG. 4 of a third embodiment of the pump housing according to the disclosure.

FIG. 6 shows the connection line 112 which is configured from the outlet 82 of the inlet valve receiving member 62 with a line portion 114 which is oblique with respect to the axis 68, a first line portion 124 which is arranged parallel with respect to the axis 68 and a second line portion 126 which is arranged at right-angles with respect to the axis 68. In this instance, the second line portion 126 is connected at the branch 122 to the line 52 in a fluid-conducting manner. With respect to FIG. 6, the first line portion 124 extends vertically and the second line portion 126 extends horizontally in this case.

Figure 7:
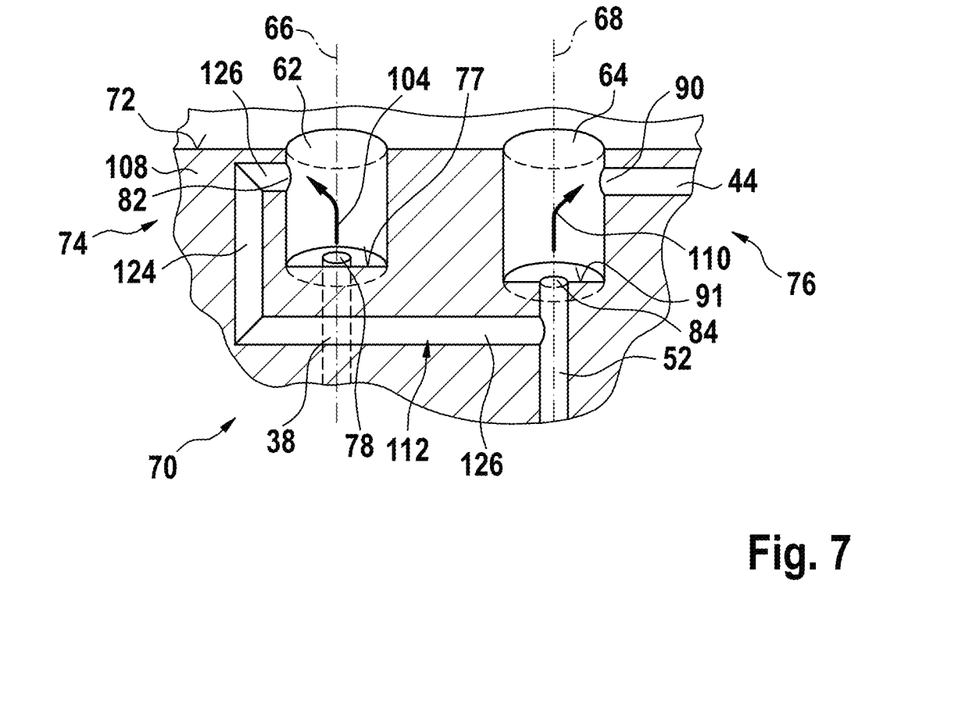
FIG. 7 shows the view according to FIG. 4 of a fourth embodiment of the pump housing according to the disclosure.

FIG. 7 shows the connection line 112 which is configured from the outlet 82 with a first horizontal second line portion 126, a vertical first line portion 124 and a second horizontal second line portion 126. In this instance, the second horizontal line portion 126 leads at the branch 122 into the line 52. Furthermore, in this instance, the outlet 82 is directed away from the outlet valve receiving member 64 or arranged on the inlet valve receiving member 62 facing in the direction toward the wheel brake cylinder side 74. Consequently, there is provided between the inlet valve 40 and the outlet valve 46 space in which additional structural elements can be integrated in the pump housing 108, such as, for example, a high-pressure switching valve.

In this instance, in all the embodiments according to FIGS. 3 to 7, all the line portions 114, 124 and 126 are arranged in a plane and consequently extend in two-dimensional space. In other embodiments which are not illustrated, the line portions 114, 124, 126 extend in three-dimensional space between the outlet 82 and the branch 122 or the region 116.

In summary, in the pump housing 108 which is configured as a hydraulic block, a bore is changed with particular regard to the connection line 112, the inlet 84 and the outlet 90 of the outlet valve receiving member 64 in such a manner that a simplified and therefore cost-optimized design of a controllable outlet valve 46 is enabled. Additional cost as a result of holes and oblique holes which are required is in this instance easily overcompensated for by the simplified design of the controllable outlet valve 46.

The invention claimed is:

1. A pump housing of a hydraulic assembly of a vehicle braking system, the pump housing comprising:
   at least one wheel brake cylinder connection for connecting a wheel brake cylinder to the pump housing;
   an outlet valve receiving receptacle;
   an outlet valve received in the outlet valve receiving receptacle, the outlet valve being configured to discharge brake fluid from the wheel brake cylinder into the pump housing and including a valve inlet which is configured to be closed with a closure member having an associated closure force;
   an inlet valve receiving receptacle associated with the outlet valve receiving receptacle;
   an inlet valve received in the inlet valve receiving receptacle, the inlet valve being configured to introduce brake fluid from the pump housing into the wheel brake cylinder via the wheel brake cylinder connection, the inlet valve receiving receptacle having an outlet configured for discharging brake fluid from the inlet valve to the wheel brake cylinder via the wheel brake cylinder connection; and
   a connection line which leads from the outlet of the inlet valve receiving receptacle and is fluidly connected to the wheel brake cylinder via the wheel brake cylinder connection,
   wherein the outlet valve receiving receptacle has an inlet configured for introducing brake fluid from the wheel brake cylinder into the outlet valve,
   wherein the inlet of the outlet valve opens into the outlet valve receiving receptacle at a base of the outlet valve receiving receptacle such that the brake fluid flows into the outlet valve in a flow direction which is directed counter to the closure force when the outlet valve is received in the outlet valve receiving receptacle, and
   wherein the connection line opens into the outlet valve receiving receptacle such that the brake fluid discharged from the inlet valve to the wheel brake cylinder connection flows through the outlet valve receiving receptacle.

2. The pump housing as claimed in claim 1, wherein the outlet valve receiving receptacle has an axis along which the closure force acts, and the inlet of the outlet valve is arranged axially with respect to the axis.

3. The pump housing as claimed in claim 2, wherein the inlet and outlet valves are configured such that the inlet valve, when brake fluid is introduced to the wheel brake cylinder, and the outlet valve, when brake fluid is discharged from the wheel brake cylinder, are flowed through in the same flow direction with respect to the axis.

4. The pump housing as claimed in claim 2, wherein the connection line is guided into a region of the outlet valve receiving receptacle facing the wheel brake cylinder.

5. The pump housing as claimed in claim 2, wherein the connection line is configured with a line portion that is oriented obliquely with respect to the axis.

6. The pump housing as claimed in claim 1, wherein the outlet valve includes a resilient element configured to apply the associated closure force to the closure member.

7. The pump housing as claimed in claim 1, further comprising:
   a motor side configured for arranging a drive motor; and
   a control device side opposite the motor side and configured for arranging a control device,
   wherein the inlet of the outlet valve is configured such that the flow direction is directed between the motor side and the control device side.

8. A vehicle brake system comprising:
   a hydraulic assembly comprising the pump housing according to claim 1.

9. A pump housing of a hydraulic assembly of a vehicle braking system, the pump housing comprising:
   at least one wheel brake cylinder connection for connecting a wheel brake cylinder to the pump housing;
   an outlet valve receiving receptacle;
   an outlet valve received in the outlet valve receiving receptacle, the outlet valve being configured to discharge brake fluid from the wheel brake cylinder into the pump housing and including a valve inlet which is configured to be closed with a closure member having an associated closure force;
   an inlet valve receiving receptacle associated with the outlet valve receiving receptacle;
   an inlet valve received in the inlet valve receiving receptacle, the inlet valve being configured to introduce brake fluid from the pump housing into the wheel brake cylinder via the wheel brake cylinder connection, the inlet valve receiving receptacle having an outlet configured for discharging brake fluid from the inlet valve to the wheel brake cylinder via the wheel brake cylinder connection; and
   a connection line which leads from the outlet of the inlet valve receiving receptacle and is fluidly connected to the wheel brake cylinder via the wheel brake cylinder connection, wherein the outlet valve receiving receptacle has an inlet configured for introducing brake fluid from the wheel brake cylinder into the outlet valve, wherein the inlet opens into the outlet valve receiving receptacle at a base of the outlet valve receiving receptacle such that the brake fluid flows into the outlet valve in a flow direction which is directed counter to the closure force when the outlet valve is received in the outlet valve receiving receptacle, wherein a wheel brake cylinder line, which connects the inlet of the outlet valve to the wheel brake cylinder connection, extends from the inlet of the outlet valve in a direction of the closure force, and wherein the connection line is connected to the wheel brake cylinder line such that the brake fluid discharged from the inlet valve to the wheel brake cylinder connection flows through the wheel brake cylinder line in the direction of the closure force.

10. The pump housing as claimed in claim 9, wherein the outlet valve receiving receptacle has an axis along which the closure force acts, and the inlet of the outlet valve is arranged axially with respect to the axis.

11. The pump housing as claimed in claim 10, wherein the inlet and outlet valves are configured such that the inlet valve, when brake fluid is introduced to the wheel brake cylinder, and the outlet valve, when brake fluid is discharged from the wheel brake cylinder, are flowed through in the same flow direction with respect to the axis.

12. The pump housing as claimed in claim 10, wherein the connection line is configured with a line portion that is oriented obliquely with respect to the axis.

13. The pump housing as claimed in claim 9, further comprising:
a motor side configured for arranging a drive motor; and
a control device side opposite the motor side and configured for arranging a control device,
wherein the inlet of the outlet valve is configured such that the flow direction is directed between the motor side and the control device side.

14. A pump housing of a hydraulic assembly of a vehicle braking system, the pump housing comprising:
at least one wheel brake cylinder connection for connecting a wheel brake cylinder to the pump housing;
an outlet valve receiving receptacle;
an outlet valve received in the outlet valve receiving receptacle, the outlet valve being configured to discharge brake fluid from the wheel brake cylinder into the pump housing and including a valve inlet which is configured to be closed with a closure member having an associated closure force;
an inlet valve receiving receptacle associated with the outlet valve receiving receptacle;
an inlet valve received in the inlet valve receiving receptacle, the inlet valve being configured to introduce brake fluid from the pump housing into the wheel brake cylinder via the wheel brake cylinder connection, the inlet valve receiving receptacle having an outlet configured for discharging brake fluid from the inlet valve to the wheel brake cylinder via the wheel brake cylinder connection; and
a connection line which leads from the outlet of the inlet valve receiving receptacle and is fluidly connected to the wheel brake cylinder via the wheel brake cylinder connection,
wherein the outlet valve receiving receptacle has an inlet configured for introducing brake fluid from the wheel brake cylinder into the outlet valve,
wherein the inlet opens into the outlet valve receiving receptacle at a base of the outlet valve receiving receptacle such that the brake fluid flows into the outlet valve in a flow direction which is directed counter to the closure force when the outlet valve is received in the outlet valve receiving receptacle,
wherein the outlet valve receiving receptacle has an axis along which the closure force acts when the outlet valve is received in the outlet valve receiving receptacle and the inlet is arranged axially with respect to the axis,
wherein the inlet and outlet valves are configured such that the inlet valve, when brake fluid is introduced to the wheel brake cylinder, and the outlet valve, when brake fluid is discharged from the wheel brake cylinder, are flowed through in the same flow direction with respect to the axis, and
wherein the connection line is configured with at least a first line portion and at least a second line portion, wherein the first line portion is guided parallel to the axis and the second line portion is guided at a right-angle with respect to the axis.

* * * * *